A. V. PARK, J. N. CAUGHT & H. HOUSE.
SHOCK NULLIFYING VEHICLE SUSPENSION.
APPLICATION FILED JULY 30, 1912.

1,089,257.   Patented Mar. 3, 1914.
2 SHEETS—SHEET 2.

Witnesses
U. A. Williams
F. Cornwall

Inventors
A. V. Park
J. N. Caught
H. House
by Jno. Massie Atty.

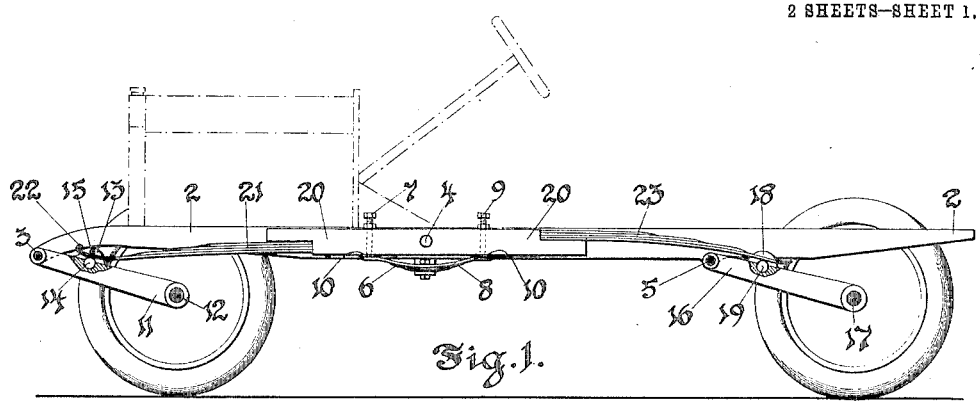

UNITED STATES PATENT OFFICE.

ALBERT VICTOR PARK, OF SOUTH MELBOURNE, AND JAMES NORMAN CAUGHT AND HERMAN HOUSE, OF ST. KILDA, MELBOURNE, VICTORIA, AUSTRALIA; SAID PARK AND CAUGHT ASSIGNORS TO SAID HOUSE.

SHOCK-NULLIFYING VEHICLE SUSPENSION.

1,089,257. Specification of Letters Patent. Patented Mar. 3, 1914.

Application filed July 30, 1912. Serial No. 712,338.

*To all whom it may concern:*

Be it known that we, ALBERT VICTOR PARK, a subject of the King of Great Britain and Ireland, and a resident of 137 York street, in the city of South Melbourne, a suburb of the city of Melbourne, JAMES NORMAN CAUGHT, a subject of the King of Great Britain and Ireland, and a resident of "Tourella," Esplanade, in the city of St. Kilda, a suburb of the city of Melbourne, and HERMAN HOUSE, a subject of the King of Great Britain and Ireland, and a resident of "Ascog," Southey street, in the city of St. Kilda, a suburb of the city of Melbourne, all in the county of Bourke, State of Victoria, Commonwealth of Australia, have invented certain new and useful Improvements in Shock-Nullifying Vehicle Suspension, of which the following is a specification.

This invention relates to the suspension of vehicle frames and the bodies supported thereby above the wheels of the vehicle, and, while applicable to most wheeled conveyances, is particularly adapted for use with motor cars and the like to which it will, for convenience, be herein described as being applied although it is not restricted thereto.

It is generally recognized that the laminated elliptical springs commonly employed to absorb inequalities in the road surface do not effectually attain that end and many arrangements have been suggested with the object of more perfectly maintaining the equilibrium of the vehicle when traveling over irregular surfaces. Among devices proposed for the purpose it has been disclosed that advantages result by diverting the shocks received by the vehicle wheels from a vertical to a horizontal direction, and distributing or communicating the said shocks from one wheel of the vehicle to the following wheel so that the shocks return to the road.

This invention aims at accomplishing the above desirable results in a simple and effective manner, the vehicle body instead of being sharply jolted receiving at most a comfortable gliding wave-like motion.

The invention possesses but few parts of a cheap character little liable to derangement and may be readily applied to existing vehicles.

It is extremely efficient in action, absorbing both great and slight shocks in a positive manner, and assists to retain the wheels of the vehicle more firmly to the ground both when encountering road inequalities and otherwise.

Figure 5:
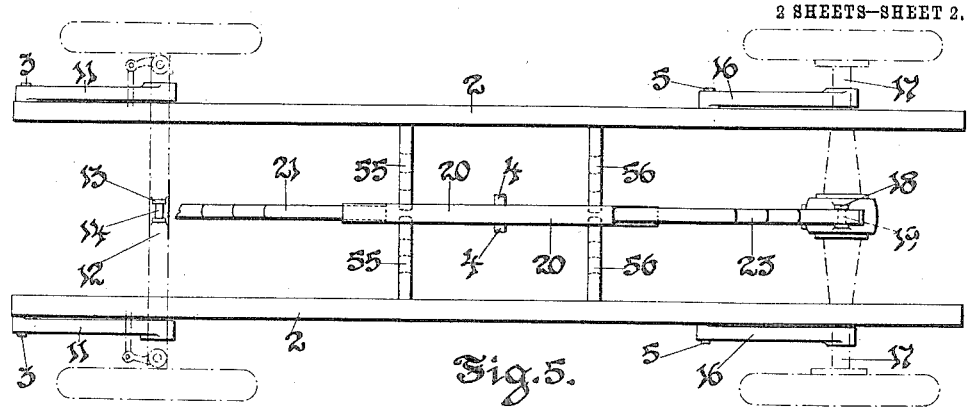
Figure 6:
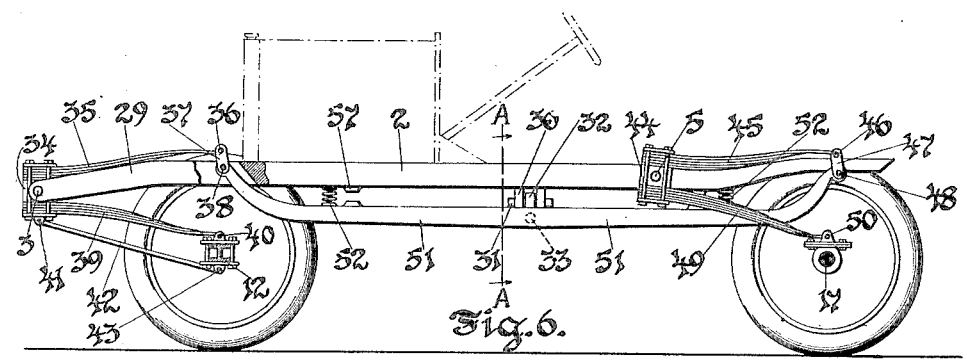
Figure 7:
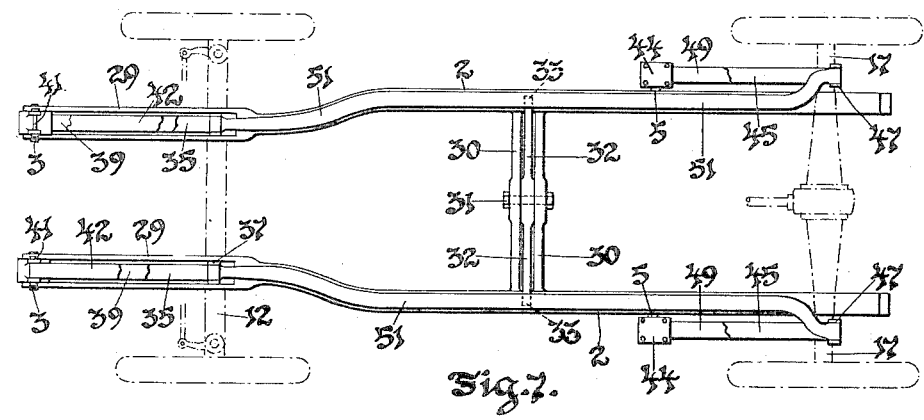
Figure 8:
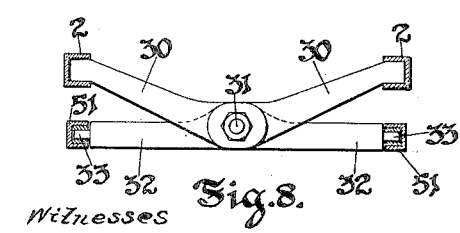
Figure 9:
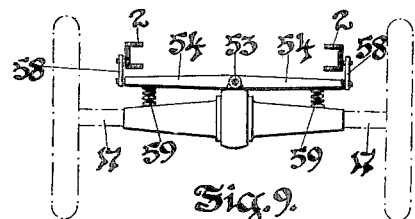

Referring to the drawings which form part of this specification:—Figure 1 is a side elevation of the invention applied to the frame of a motor car. Fig. 2 is a plan of the invention as seen in Fig. 1. Fig. 3 is a side elevation of the invention slightly modified for application to certain types of existing vehicles. Fig. 4 is a side elevation of the invention as applied to another type of existing vehicle. Fig. 5 is a plan of the invention applied in a modified manner. Fig. 6 is a side elevation of a modified form of the invention. Fig. 7 is a plan of Fig. 6. Fig. 8 is a cross section of the frame shown in Fig. 6, on line A A. Fig. 9 is a rear elevation of an additional modification which may be used with the invention as illustrated in Figs. 1, 2, 3 or 4.

The invention includes a chassis or frame 2. Protruding from each side of the front end of this frame is a front pivot pin 3. Also protruding from each side of the frame is an intermediate pivot pin 4 and near the rear of the frame, a back pivot pin 5 or as an alternative construction the intermediate pivot pin 4 may extend across the frame.

Secured to a bracket or the like attached to each side of the frame is a load balance and reflex spring. This may be of any suitable design but preferably is of a laminated character. It has a front portion 6 disposed between the front pivot pin 3 and the intermediate pivot pin 4. Passing through a compensating beam hereinafter described above the front portion 6 and bearing upon the same is a front adjusting screw 7 by which the tension of that portion of the spring may be regulated. Each spring also has a back portion 8 disposed between the intermediate pivot pin 4 and the back pivot pin 5. Passing through the compensating beam above the back portion 8 and bearing upon the same is a back adjusting screw 9 by which the tension of that portion of the spring may be regulated. Or one or more springs of any suitable nature may be used and the tension be also adjusted in any other convenient manner.

Above or attached to each balance spring is a cushioning pad 10.

Pivoted to each front pivot pin 3 is the upper end of a backwardly inclined front radiating arm 11 the lower end of which is secured to the front axle 12 of the vehicle. Upstanding from each front arm 11 are two spring guides 13 extending between which is a friction roller 14. Extending across the top of the spring guides of each front arm may be a cross pin 15.

Pivoted to each back pivot pin 5 is the upper end of a backwardly inclined rear radiating arm 16 the lower end of which embraces or is connected to the back axle 17 of the vehicle, or to the casing usually inclosing the same in motor driven vehicles. Upstanding above each rear arm 16 are two spring guides 18 extending between which is a friction roller 19. Extending across the top of the spring guides of each rear arm may be a cross pin.

Pivoted to each intermediate pivot pin 4 is a longitudinally disposed compensating beam 20, attached to the front end of which is a front laminated part-elliptical spring 21. Each spring 21 bears at its front end upon its friction roller 14 and is provided with an upturned or enlarged front end 22. Attached to the rear end of each compensating beam 20 is a back laminated part-elliptical spring 23. Each spring 23 bears at its lower end upon its friction roller 19. Each of the springs 23 may be provided with an upturned end. Each beam carries the adjusting screws 7 and 9 before described.

In applying the invention to some forms of existing frames, the rear arms 16 are dispensed with and the lower end of each back spring 23 is pivotally connected by a pivot pin 24 to the casing inclosing the back axle 17 of the vehicle. This is shown clearly in Fig. 3.

In applying the invention to another form of existing frame, each front arm 11 is provided with a pivot pin 25 to which is pivoted a link 25ª, the lower end of the relative front spring being pivoted by a pivot pin 25ᵇ to its link. Each rear arm 16 is also provided with a pivot pin 26 to which is pivoted a link 27. The lower end of each back spring 23 is pivoted by a pivot pin 28 to its link 27. This is clearly shown in Fig. 4.

The invention as so far described provides a compensating beam at each side of the vehicle. A single beam centrally pivoted to the frame and having all of the characteristics described may, however, be employed, as seen in Fig. 5. The two front arms 11 and the two rear arms 16 are still necessary to this construction. The spring guides 13 and 18 and friction rollers 14 and 19 are then carried, however, by the front and back axles of the vehicle as shown. Front load balance and reflex springs 55 may project inwardly from the frame and bear beneath the beam, and back load balance and reflex springs 56 likewise project inwardly from the frame and bear beneath the beam. These springs are, it will be seen, the equivalent of the front and back spring portions 6 and 8.

In a modification, as shown in Figs. 6, 7 and 8, a chassis or frame 2 may be provided with forked front ends 29 and the front pivot pins 3 may be mounted in the said ends. The frame may also be provided with intermediate cross members 30, carrying a longitudinally disposed pivot pin 31. Pivoted to the pivot pin 31 is a cross beam 32 having at each end a pin or trunnion 33. The pins or trunnions 33 are the equivalent of the intermediate pivot pin 4. The frame is also provided with the back pivot pins 5 already described. Pivoted to each front pivot pin 3 is a rocking block 34. Attached to each front rocking block 34 is the front end of an upper spring 35, the back end of which flares or inclines upwardly and is provided with a pivot pin 36. Pivoted to each pin 36 is a link 37 carrying at its lower end a pivot pin 38. Attached to each front rocking block 34 is the front end of a lower spring 39 the back end of which flares or inclines downwardly and is pivoted by a pivot pin 40 to the front axle 12 of the vehicle. Pivoted by a pivot pin 41 to each rocking block 34 is the front end of a radius rod 42, the rear end of which is pivoted by a pivot pin 43 to the front axle 12. Pivoted to each back pivot pin 5 is a back rocking block 44. Attached to each back rocking block 44 is the front end of an upper spring 45, the back of which flares or inclines upwardly and is provided with a pivot pin 46. Pivoted to each pivot pin 46 is a link 47 carrying at its lower end a pivot pin 48. Attached to each back rocking block 44 is the front end of a lower spring 49, the back end of which flares or inclines downwardly and by a pivot pin 50, is pivoted to the back axle 17 of the vehicle or to the casing usually inclosing the axle in motor driven vehicles. Pivoted to the intermediate pivot pins or trunnions 33 of the intermediately pivoted cross beam 32 is a longitudinally disposed compensating beam 51. The front end of each beam 51 is pivotally connected by the pivot pin 38, to its relative link 37. The back end of each beam 51 is pivotally connected, by its pivot pins 48, to its relative link 47. Interposed between each beam 51 and the chassis or frame 2 of the vehicle, on each side of each pin or trunnion 33, is a balance spring 52. Rubber or other resilient buffer blocks or limit stops 57 may also be employed.

In a further modification, as shown in Fig. 9, a rear pivot pin 53 may be provided upon the back axle or casing inclosing the same and to the said pin a subsidiary cross beam 54 may be pivotally connected. Between each end of the said beam 54 and the frame 2 is a link 58 and interposed between the beam 54 and the back axle 17 at or near each end thereof is a spiral or other spring 59. It will be readily understood that this modification may be applied to any of the designs shown in Figs. 1, 2, 3 or 4.

The cycle of operations with this invention is as follows:—Referring particularly to Fig. 1 it will be seen that the load weight is communicated by the intermediate pivot pins 4 to each compensating beam 20 which pins 4 are therefore the only point of actual suspension of the load. By the springs 21 and 23 the beams are supported and the weight or load is conveyed to the front and back arms 11 and 16 and to the vehicle wheels. The weight being applied to the arms 11 and 16 between the pivot pins 3 and 5 and the front and back axles, tends to force the arms downwardly and therefore (more or less) forces the frame and the load toward the road. The pins 3 and 5 are therefore not points of suspension of the load and the arms are merely to permit radiation of the wheels of the vehicle. The frame in this instance is actually suspended centrally by a single point at each side of the vehicle, i. e., the intermediate pivot pins 4.

When the vehicle is in motion and meets an inequality or obstruction owing to inertia, it will be understood that the tendency of the springs of the compensating beams is to attempt to lift or carry more than their alloted share of the load.

Upon a front wheel of the vehicle encountering a road inequality it rises causing its front arm 11 to radiate. The shock is thereby communicated to the front spring 21, the front end of which has a sliding contact with the arm beneath it. Whether the shock overcomes the resistance offered by the spring or not it is evident that the front end of the compensating beam 20 must also rise (more or less) causing the back end of the said beam to descend to an equal extent. The shock is thereby communicated to the back spring 23 the lower end of which has a sliding contact with the back arm 16 beneath it. The shock is thus distributed from the road through the front wheels back to the road through the back wheels of the vehicle and causes the back wheels to grip the ground. All shocks pass around the pivotal suspension point of the compensating beam affected.

A similar operation takes place upon a back wheel encountering an obstruction. To provide for the out-of balance load, that is, more passengers or weight in one part of the vehicle than another, the springs 6—8 are provided. It will be obvious that should there be more weight on one side of the pins 4 than the other such weight will be sustained by the springs 6—8 which are of sufficient stability to effect this purpose. These springs also absorb the reflex or rebound of the vehicle when a road inequality is encountered. The cushions 10 are provided mainly to minimize noise and to soften the contact and the adjusting screws 7 and 9 to maintain the tension of the springs as is obvious. Any other means however, may be employed for maintaining or adjusting the said tension.

With the modified designs illustrated in Figs. 3 and 4 the action of the various parts is the same as that described with reference to Fig. 1.

The movements and functions of the parts are also the same with the arrangement shown in Fig. 5 excepting that in this instance there is but one pivotal center at which the load is suspended and the beam is supported directly by the axles.

While the general results obtained by the arrangements shown in Figs. 6 and 7 will be the same as those obtained from the arrangement shown in Fig. 1, the parts are differently combined and in detail operate as follows. Upon a front wheel encountering a road inequality and rising it causes the axle end of the front lower spring 39 also to rise and describe an arc about the front pivot pin 3 rocking or moving the block 34 upon the said front pivot pin 3. The shock is thereby communicated to the upper spring 35 which by its link 37, lifts (more or less) the front end of the compensating beam 51. The rear end of the said beam thereby descends, carrying with it its link 47 and the back end of the upper spring 45. The said spring thus describes an arc about the back pivot pin 5 rocking or moving the back block 44 upon the said back pivot pin 5 and communicating the shock to the lower spring 49 and to the back axle 17 and wheels supporting the same.

By the intermediately pivoted cross beam 32 lateral movement of the frame is compensated permitting the wheels at one side of the said frame to be at a higher elevation than those at the other side, without affecting the horizontal plane of the frame, while both may successfully encounter road inequalities independently. It will be apparent, that the cross beam 32 could be dispensed with and the longitudinal compensating beams 51 be pivoted direct to the frame. By the balance springs 52 the out-of balance load is provided for in a similar manner to the springs 6 and 8 already mentioned. The reflex or re-bound of the load is amply provided for by the springs 35—39 and 45—49 and the balance springs 52.

With the further modification shown in Fig. 9 it is proposed to absorb a succession of minute shocks and vibrations which perhaps may not be absorbed by the foregoing arrangements. This particularly applies to badly made wooden block roads cobble stones and the like. The load is suspended at the pivot pin 53, the springs 59 being only strong enough to carry the out of balance load. Upon one of the back wheels meeting such a series of small obstructions, with this modification, it would rise without elevating the frame or vehicle body for the relative spring 59 would be compressed and absorb the vibratory shocks. The corresponding end of the subsidiary cross beam will also rise and communicate the slight shocks to the other back wheel.

In referring to the various compensating beams in combination these beams will be termed the secondary frame of the vehicle.

It should also be pointed out that the front and rear arms 11 and 16 and the flaring springs 35—39 and 45—49 are all projected backwardly and in the same direction as the vehicle is normally traveling. This is considered an important feature for the shocks are all diverted in the direction of travel of the car.

Having now described our invention what we claim as new and desire to secure by Letters Patent is:—

1. A vehicle suspension consisting in the combination with a frame and axles therefor, of a compensating beam at each side of the frame and intermediately pivoted to suspend the load by the beam pivots, springs extending from the beams, means for supporting the axles on the frame, said springs being supported by the means which supports the axles.

2. A shock absorbing vehicle suspension consisting in the combination with a frame and axles therefor, of a compensating beam at each side of the frame and having a central pivotal suspension for the load, springs extending from the beams, means for supporting the springs between the axles and the frame, resilient means for balancing the load and absorbing reflex of the frame when an obstruction is encountered, and means for adjusting the resiliency of the balancing and reflex absorbing means.

3. A shock absorbing vehicle suspension consisting of the combination with a frame and wheels thereof, of a longitudinally disposed intermediately pivoted compensating beam at each side of the vehicle, a spring resistance between each end of each beam and the corresponding vehicle wheels, and a load balancing and reflex absorbing spring at each side of the pivotal center of each beam.

4. A vehicle suspension consisting in the combination with a frame and axles therefor, of a compensating beam at each side of the frame, each beam having a central pivot by which the load is suspended, springs extending from the ends of the beams and pivoted radiating arms between the frame and the axles and forming supports for the springs.

5. A shock absorbing vehicle suspension consisting of a main load carrying frame, a secondary frame pivoted to the main frame centrally of said load, a plurality of axles, a plurality of rearwardly directed resilient connectors between said axles, and secondary frame, and wheels carried by said axles.

6. A shock absorbing vehicle suspension consisting in the combination of a main frame comprised of rigidly connected longitudinal and transverse members and a secondary frame composed of pivotally connected longitudinal and transverse members, wheel supported axles beneath said secondary frame, elongated members carrying said axles and pivoted to the main frame in advance of the axles, shock absorbing springs fixed to the secondary frame and connected to said elongated members.

7. A vehicle suspension consisting in the combination with a frame and axles therefor, of a longitudinally disposed compensating beam at each side of the frame, a central pivot for each beam to suspend the load, pivoted radiating arms between the axles and frame and inclined with their upper ends toward the forward direction of travel, and a spring resistance between each end of each beam and its corresponding radiating arm.

8. A shock absorbing vehicle suspension consisting of the combination with a frame and front and back axles thereof, of a longitudinally disposed compensating beam at each side of the frame and intermediately pivoted thereto, a backwardly inclined arm pivotally disposed between each axle and the frame at each side thereof, a spring resistance between each arm and the corresponding end of its compensating beam, and a load balancing spring adjustable in tension and bearing at each side of the pivotal center of each beam.

9. A shock absorbing vehicle suspension consisting of the combination with a vehicle frame and front and back axles thereof, of a compensating beam longitudinally disposed at each side of the frame and intermediately pivoted thereto, a backwardly inclined arm between each axle and the frame at each side thereof and pivotally connected to the frame at its upper end and connected to the corresponding axle at its lower end, and a spring resistance between the end of each beam and the corresponding arm and bearing between the two ends thereof.

10. A shock absorbing vehicle suspension consisting of the combination with front and back axles below a frame, of a longitudinally disposed compensating beam at each side thereof and intermediately pivoted thereto, an arm secured to each axle and pivoted to the frame at each side thereof, and a spring resistance secured to each compensating beam at each end thereof and slidably bearing upon the corresponding arm between its two ends.

11. A shock absorbing vehicle suspension consisting of the combination with front and back axles below a frame, of a longitudinally disposed compensating beam at each side thereof and intermediately pivoted thereto, an arm secured to each axle and pivoted to the frame at each side thereof, spring guides to each arm, a friction roller between the guides, a part-elliptical laminated spring secured to each compensating beam at each end thereof and slidably bearing between the guides and upon the friction roller of the corresponding arm, and load balance and reflex absorbing springs bearing upon each beam.

12. A shock absorbing vehicle suspension consisting in the combination with a frame and front and back axles therefor, of a longitudinally disposed compensating beam at each side thereof and intermediately pivoted thereto, an arm secured to each front axle and pivoted to the frame at each side thereof, a part-elliptical laminated spring secured to one end of each beam and bearing upon its corresponding arm, a part-elliptical laminated spring secured to the other end of each beam and bearing upon the back axle, and load balancing and reflex absorbing springs bearing upon each beam between the central pivots and the axles.

13. A shock absorbing vehicle suspension consisting in the combination with a frame and front and back axles therefor, of a longitudinally disposed compensating beam at each side thereof and intermediately pivoted thereto, an arm secured to each axle and pivoted to the frame at each side thereof, a part-elliptical laminated spring secured to each compensating beam at each side thereof and pivotally connected to the corresponding arm, and load balance and reflex absorbing springs bearing upon each beam.

14. The combination with a vehicle frame and axles therefor, of a compensating beam suspending at a single point at its center the load of the vehicle, means to support the beam between the axles, and a load balancing and reflex absorbing spring at each side of the pivoted center of each beam.

15. A shock absorbing vehicle suspension consisting in the combination with a frame and axles therefor, of a longitudinally disposed compensating beam pivoted at its center to the frame and supporting the load at its pivotal center, a resilient resistance between the ends of the beam and the axles and supporting the beam between the said axles, resilient load balancing means carried by the frame and bearing against the beam for absorbing the reflex of the load when a road inequality is encountered, and pivoted radiating arms between the axles and the frame.

16. A shock absorbing vehicle suspension consisting in the combination with a frame and axles therefor, of a longitudinally disposed compensating beam pivoted at its center to the frame and supporting the load at its pivotal center, a spring secured to each end of the beam and extending in direction of the axles and supported thereby, a spring bearing upon the beam at each side of its pivotal center, and pivoted radiating arms between the axles and the frame.

17. A shock absorbing vehicle suspension consisting in the combination with a frame and axles therefor, of a longitudinally disposed compensating beam pivoted at its center to the frame and supporting the load at its pivotal center, a resilient resistance between the ends of the beam and the axles and supporting the beam between the said axles, resilient load balancing means for absorbing the reflex of the load when a road inequality is encountered, and backwardly inclined radiating arms pivoted at their upper ends at each side of the frame and connected at their lower ends to the axles, the upper end of each arm being disposed toward the front of the frame and in the direction of forward travel.

18. A shock absorbing vehicle suspension consisting in the combination with a frame and axles therefor, of a longitudinally disposed, compensating beam pivoted at its center to the frame and supporting the load at its pivotal center, a part-elliptical laminated spring attached to each end of the beam, a load balancing and reflex absorbing spring bearing upon the beam between its pivotal center and each axle, and backwardly inclined radiating arms pivoted at their upper ends at each side of the frame and connected at their lower ends to the axles, the upper end of each arm being disposed toward the front of the frame and in the direction of normal travel, and supporting the ends of the laminated springs.

19. A shock absorbing vehicle suspension consisting in the combination with a frame and axles therefor, of a longitudinally disposed compensating beam at each side of the vehicle and having a central pivotal suspension for the load, springs extending from opposite ends of the beams and means for supporting each end of the springs between the axles and to the frame to nullify road inequalities and the reflex of the load.

20. A shock absorbing vehicle suspension consisting of the combination with a frame and axles therefor, of a longitudinally disposed centrally pivoted compensating beam, at each side of the vehicle, springs extending from each end of the beams and a rocking resilient resistant connecting each end of each spring with the corresponding axle and the frame.

21. A shock absorbing vehicle suspension consisting of the combination with a frame and axles therefor of a longitudinally disposed centrally pivoted compensating beam at each side of the frame, a spring extending from each end of the beam a rocking resilient resistant connecting each end of each spring with the corresponding axle and the frame, and load balancing means between the pivotal center of each beam and each resistant and absorbing load reflex.

22. A shock absorbing vehicle suspension consisting of the combination with a frame and axles therefor, of a cross beam centrally pivoted to the frame, a longitudinally disposed compensating beam centrally pivoted to each end of the cross beam, and resilient means between the frame and the axles to support the ends of the longitudinal beams.

23. A shock absorbing vehicle suspension consisting of the combination with a frame and axles therefor of a cross beam centrally pivoted to the frame, a longitudinally disposed compensating beam centrally pivoted to each end of the cross beam, rocking means disposed in the direction of normal travel of the vehicle to resilient means at each end of the longitudinal beam between the axles and the frame, and load balancing means between the longitudinal beams and the frame and absorbing reflex of the load.

24. A shock absorbing vehicle suspension consisting of the combination with a frame and axles therefor, of a cross beam centrally pivoted to the frame, a longitudinally disposed compensating beam centrally pivoted to each end of the cross beam, a resilient resistance at each end of each longitudinal beam to support the beams, and load balancing means at each side of the pivotal center of each longitudinal beam between the beam and the frame to absorb re-bound of the frame when a road inequality is encountered.

25. A shock absorbing vehicle suspension consisting of the combination with a frame and axles therefor, of a longitudinally disposed centrally pivoted compensating beam, a rocking block carried by the frame and adjoining each end of the beam, a lower spring extending between each block and the corresponding axle, and an upper spring attached to each block and pivotally connected to the corresponding end of the beam.

26. A shock absobing vehicle suspension consisting of the combination with a frame and axles therefor, of a cross beam centrally pivoted to the frame, a longitudinally disposed compensating beam centrally pivoted to each end of the cross beam, a rocking block carried by the frame and adjoining each end of each longitudinal beam, a lower flaring spring extending between each block and the corresponding axle, an upper flaring spring attached to each block and pivotally connected to the corresponding end of the relative beam, and a balancing and reflex absorbing spring between the end of each longitudinal beam and its pivotal center.

27. In a vehicle suspension and in combination with a frame below which is a back axle, a cross beam linked at each of its ends to the frame and centrally pivoted to the back axle, and a resilient resistance between each end of the cross beam and the back axle.

28. A shock absorbing vehicle suspension consisting of the combination with a frame and axles therefor, of a longitudianlly disposed compensating beam at each side of the frame and centrally pivoted thereto, the load being supported by the beam pivotal centers, means to resiliently support the beams between the axles, a cross beam pivotally connected at each of its ends to the frame and centrally pivoted to the back axle the weight or load being carried by the central pivot and a resilient resistance between each end of the cross beam and the back axle.

In testimony whereof we affix our signatures in presence of two witnesses.

ALBERT VICTOR PARK.
JAMES NORMAN CAUGHT.
HERMAN HOUSE.

Witnesses:
 CECIL M. SLASTRELL,
 GEORGE A. McREN.